(12) United States Patent
Boles et al.

(10) Patent No.: US 12,367,146 B1
(45) Date of Patent: Jul. 22, 2025

(54) SHARED MEMORY DEVICE WITH HYBRID COHERENCY

(71) Applicant: Arm Limited, Cambridge (GB)

(72) Inventors: David Alan Boles, Austin, TX (US); David Joseph Hawkins, Austin, TX (US); Sandipkumar Ladhani, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/604,816

(22) Filed: Mar. 14, 2024

(51) Int. Cl.
*G06F 12/0815* (2016.01)
*G06F 12/0806* (2016.01)

(52) U.S. Cl.
CPC ...... *G06F 12/0815* (2013.01); *G06F 12/0806* (2013.01)

(58) Field of Classification Search
None
See application file for complete search history.

(56) References Cited

U.S. PATENT DOCUMENTS

2016/0328326 A1* 11/2016 Di Blas ............... G06F 12/0837
2020/0349076 A1* 11/2020 Dropps ............... G06F 12/0817
2021/0124582 A1* 4/2021 Kerr ...................... G06F 9/3009
2022/0050780 A1* 2/2022 Passint ............... G06F 12/0815
2023/0236995 A1 7/2023 Jayaraman et al.

OTHER PUBLICATIONS

Debendra Sharma (Compute Express Link (CXL): Enabling Heterogenous Data-Centric Computing With Heterogeneous Memory Hierarchy) further teaches cache coherent system. IEEE 2022: pp. 99-109.*

* cited by examiner

*Primary Examiner* — Kaushikkumar M Patel
(74) *Attorney, Agent, or Firm* — Leveque Intellectual Property Law, P.C.

(57) ABSTRACT

A memory device includes a memory array with first and second memory regions, multiple communication ports and coherency control circuitry. The communication ports couple the memory device to host computers, enabling a first host to write a data block to the second region, write a message, including a data descriptor of the data block, to the first or second region, and write message metadata, associated with the message, to the first region, and also to enable a second host to read the message metadata, the data descriptor and the associated data block. The coherency control circuitry controls coherency of data in the first region, including sending an invalidation request to the second host to invalidate a copy of the message metadata stored in a local cache of the second host. The invalidation request is sent in response to the first host writing the message metadata to the first region.

20 Claims, 7 Drawing Sheets

FIG. 4
(Alternative implementation)

SHARED MEMORY DEVICE WITH HYBRID COHERENCY

BACKGROUND

Existing software stacks that share data between host computers of a data processing system use remote direct memory access (RDMA) to migrate data from the memory of one computer into that of another without involving either one's operating system. This migration may be performed, for example, by executing libraries that are dynamically linked to software applications. RDMA transfers have relatively large latency. Additionally, in a data center, for example, the RDMA approach consumes bandwidth on the highest cost interconnect.

BRIEF DESCRIPTION OF THE DRAWINGS

The accompanying drawings provide visual representations which will be used to describe various representative embodiments more fully and can be used by those skilled in the art to understand better the representative embodiments disclosed and their inherent advantages. In these drawings, like reference numerals identify corresponding or analogous elements.

DETAILED DESCRIPTION

The various apparatus and devices described herein provide mechanisms for coherent sharing of a memory device between host computers.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

An embodiment of the present disclosure provides a mechanism for connected memory sharing between host computers. The host computers may be connected to a shared memory device via a link such as a Compute Express Link® (CXL®). CXL is an industry-supported interconnect for computers, memory expansion and accelerators that enables high-speed data transfer between a host computer memory space and memory on an attached device. CXL uses the PCI-SIG Peripheral Component Interconnect Express® (PCIe®) physical and electrical interface standards.

The disclosed mechanism uses software coherency for a large portion of the memory and hardware coherency for only a small portion of the memory. Reducing the portion of memory tracked with hardware coherency simplifies the memory devices, thereby reducing both chip area and power consumption.

Embodiments of the disclosure provide a memory device that includes a memory array with first and second memory regions, multiple communication ports and coherency control circuitry. The communication ports couple the memory device to host computers of a data processing system, enabling a first host to write a data block to the second region, write a message, including a data descriptor of the data block, to the first or second region, and write message metadata, associated with the message, to the first region, and also to enable a second host to read the message metadata, the data descriptor and the associated data block. The coherency control circuitry controls coherency of data in the first region, including sending an invalidation request to the second host to invalidate a copy of the message metadata stored in a local cache of the second host. The invalidation request being sent in response to the first host writing the message metadata to the first region.

The message metadata may include a write index of a message queue in the first or second memory region, the message queue associated with the second host computer. Alternatively, the message metadata may include a "message ready" bit set by the first host computer and cleared by the second host computer.

The data descriptor of the data block may include, for example, a base address, a data element count and a data element size.

The cache coherency circuitry may include a snoop filter cache and be configured to respond to the second host computer reading the message metadata by updating a presence vector in the snoop filter cache to indicate a copy of the message metadata in the local cache of the second host computer, and to respond to the first host computer updating the message metadata by identifying, from the presence vector, the second host computer having a copy of the message metadata in a local cache of the second host computer and sending the invalidation request to the identified second host computer.

A host computer may include a communication port for coupling the host computer to a communication port of the memory device, one or more processors, and a local cache, accessible to the one or more processors, The local cache is configured to store a copy of message metadata read from the memory device via the communication port and to invalidate the copy of the message metadata in response to a request from the memory device via the communication port. In operation, the host computer polls the message metadata. In the event of a cache hit the host accesses a copy of the message metadata in the local cache, while in the event of a cache miss the host reads an updated copy of the message metadata from the memory device, reads a data descriptor from a message in accordance with the updated copy of the message metadata, and reads a data block from the second memory region in accordance with the data descriptor.

Various embodiments of the disclosure provide a method of data transfer in a data processing system. A first host computer of data processing system writes a data block to a software-controlled memory region of a memory device via a chip-to-chip communication link, writes a message to the software-controlled memory region of the memory device or a hardware coherent memory region of the memory device, the message including a data descriptor of the data block, and updates message metadata in a cache line of the hardware coherent memory region of the memory device, the cache line associated with a second host computer of the data processing system. A coherency control circuitry for the hardware coherent memory region sends an invalidation request to the second host computer in response to updating the message metadata. The second host computer reads the updated message metadata from the hardware coherent memory region, reads the data descriptor from the message, and accesses the data block in accordance with the data descriptor. The message may be stored in a message queue and the message metadata includes a write index of the message queue. Alternatively, the message metadata may include a "message ready" bit, The first host computer sets the message ready bit after updating the message metadata and the second host computer clears the message ready bit after reading the message metadata.

The second host computer reads the message metadata, prior to the first host computer updating the message metadata and storing a copy of the message metadata in a local cache of the second host computer, polls the message metadata, and invalidates the copy of the message metadata in the local cache of the second computer in response to receiving the invalidation request from the hardware coherency controller. The second host computer accesses the data block after detecting a change in the message metadata, Polling by the second host computer may include reading the copy of the message metadata in the local cache when the copy is valid and reading the message metadata in the hardware coherent memory region when the copy is invalid.

In one embodiment, a memory device is visible to N host computers through a CXL hierarchy. All, or part, of the memory is visible to more than one host computer and may be visible to all N host computers. A small region of the memory (e.g., 1 MB) is hardware coherent and the remainder may be used as "software coherent" or "software-controlled," in that coherency is controlled by software executing on the host computers. As described above, existing software stacks that share data between host computers use remote direct memory access (RDMA) to migrate data from the memory of one computer into that of another without involving either one's operating system. Data is transferred to application memory via a network interface controller, for example, without using processor cores or caches. The transfer may be performed by libraries that are dynamically linked to applications. In accordance with the present disclosure, these libraries can be extended to accommodate data transfers between host computers attached to a shared memory device.

In the case where host computers are attached to a shared memory device, the data can be copied to the shared memory device into the software-controlled region and a single cache line changed in the hardware coherent region to signal that new data is available to the recipient host. The recipient host computer can poll the cache line as it waits for new data, resulting in a messaging mechanism with very low latency and high bandwidth.

Since the size of the hardware coherent memory is small, the device can use a small snoop filter cache to maintain knowledge of the state of all of the cache lines within the hardware coherent region. The small size of the snoop filter cache enables it to be maintained in an on-die static random-access memory (SRAM) structure that scales to any number of attached hosts, regardless of their hardware capabilities (such as their cache sizes).

The existing approach using RDMA transfers has minimum latencies of about 5000 nano-seconds and expected latencies of between two and ten times as long. In a data center, this approach consumes bandwidth on the highest cost interconnect. In contrast, the disclosed approach has a minimum latency of about 300 nano-seconds, and expected latencies bound by the lowest cost interconnect in a server system—such as an existing link implementing the PCIe® standard of PCI-SIG, Thus, the disclosed approach is significantly faster and reduces loading on data center network lines.

The disclosed mechanism may be used, for example, for multi-headed dynamic capacity devices (MH-DCDs) deployed in scale-out database or data-analytic workloads, or in high-performance computing applications. The mechanism provides high-performance data sharing between multiple hosts and allows hosts to create data for sharing without any coherency overhead. The mechanism recognizes that coherency is not required for read-only data. The coherency overhead is only incurred at the moment of sharing—not before and not after.

The mechanism reduces communication latency from around 10,000 ns to about 300 ns. In addition, the mechanism reduces complexity compared to full coherency tracking since the amount of memory that needs to be tracked is greatly reduced. For example, in some embodiments the amount of memory tracked is reduced by an order of $10^3$ or even $10^4$. This reduction enables direct tracking of cache line states, independent of host cache size. In turn, this allows a small tracking structure (snoop filter cache) to be implemented in static random-access memory (SRAM) on the same die as the memory array. As a result, there is no impact on remote die or package-external memory and the mechanism can slot into existing inter-host data sharing schemes.

In one embodiment, NVMe®-style (Non-Volatile Memory express) message queues are used for inter-host communication. Software-controlled memory is used for bulk intermediate data products and inter-host message content. Hardware coherent memory is used for per-queue read/write indexes. This incurs very small snoop filter overhead.

In one embodiment, a data transfer is achieved as follows:
(1) Host A writes a data block to the software-controlled region.
(2) Host A flushes data block to the device.

(3) Host A writes a data block descriptor to a message queue in the software-controlled region (the descriptor points to data block).

(4) Host A flushes the descriptor to the device.

While waiting for a new message, Host B polls a line with the write index. This may be done efficiently since a copy of the write index is loaded into an Li cache of Host B. The transfer continues as:

(5) Host A updates the write index (which Host B is polling on)

(6) The hardware coherency circuitry of the memory device sends an invalidation request to Host B.

(7) A subsequent load by host B misses in the cache and so Host B reads the line from the device, getting the updated write index.

Steps (1)-(4) are limited by only interface performance and do not result in any coherence traffic.

In one embodiment, step (6) may constitute a single CXL back-invalidate transaction (device-to-host) and step (7) may constitute a single transaction by host B to read the updated line (host-to-device response with data).

In a further embodiment, the write index is included with the invalidation request.

Figure 1:
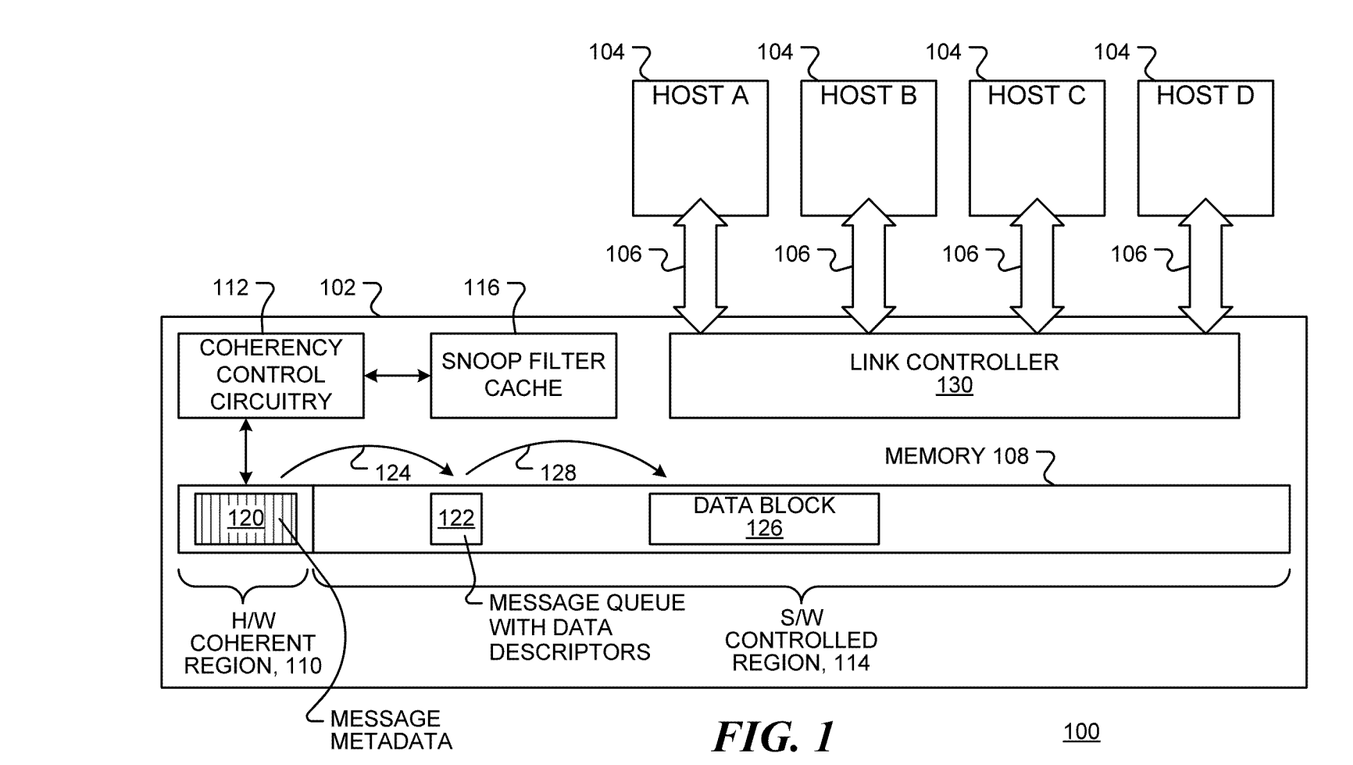
FIG. 1 is a block diagram of a data processing system, in accordance with various representative embodiments.

FIG. 1 is a block diagram of a data processing system 100, in accordance with various representative embodiments. Data processing system 100 includes memory device 102 and a plurality of host computers 104. The memory device is located on a different chip from the host computers. It may be located in the same package, on the same circuit board, or at a location remote from the host computers. Each host computer 104 is coupled to memory device 102 via an inter-chip communication link 106, such as a CXL. Other links may be used without departing from the present disclosure. Link 106 may be a direct link or a hierarchy of links.

Memory device 102 includes memory array 108. Memory array 108 may include non-volatile memory, such as a solid-state memory, or a volatile memory such as Dynamic Random-Access Memory (DRAM) or Double Data Rate Synchronous Dynamic Random-Access Memory (DDR SDRAM), for example. Other types of memory may be used without departing from the present disclosure. Data in memory array 108 may be shared between host computers 104.

In accordance with various embodiments, memory array 108 includes a first memory region 110 that is a hardware coherent memory region monitored by coherency control circuitry 112, and second memory region 114 that is not monitored by the coherency control circuitry. Coherency control circuitry 112 may be a snoop filter controller, in which case coherency metadata is stored in snoop filter cache 116. Coherency control circuitry 112 may use a MESI or MOESI protocol, for example. The metadata indicates the coherency state of the hardware coherent memory region and may include presence vectors that indicate which of the host computers has a copy of cache line data in its local cache. In an alternative embodiment, each bit in the presence vector is associated with a group of host computers and the set is set if any of the group has a copy of cache line data in its local cache. In a still alternative embodiment, a presence vector isn't needed, and invalidation requests are broadcast to all host computers. In accordance with the present disclosure, memory region 114 may be operated as a software-controlled memory region. Coherency of data in memory region 114 may be controlled by software executing on one of more of the host computers 104, hence second memory region 114 is also referred to herein as a software-controlled memory region.

In an embodiment, hardware coherent memory region 110 is used to store message queue descriptors 120. Each message queue descriptor describes a message queue 122 stored in software-controlled memory region 114, as indicated by arrow 124. In turn, a message in message in queue 122 contains a data descriptor for data block 126, also stored in software-controlled memory region 114, as indicated by arrow 128.

Link controller 130 provides a number of communication ports, enabling chip-to-chip communication between the memory device and the host computers.

Data processing system 100 may be used for coherent transfer of data between host computers.

Figure 2:
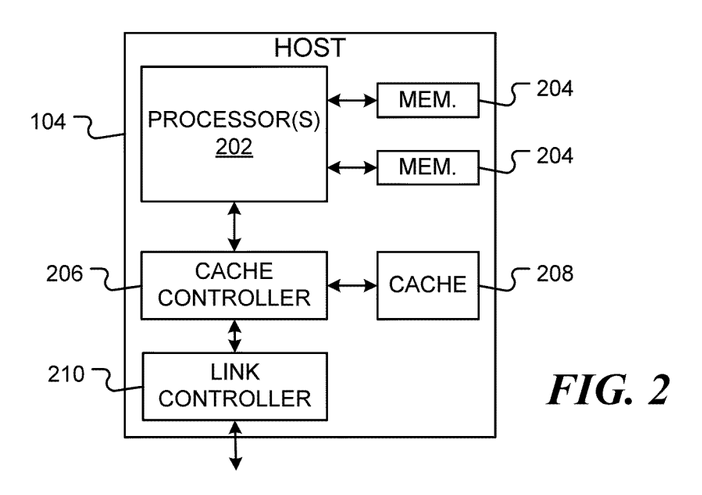
FIG. 2 is a block diagram of a host computer, in accordance with various representative embodiments.

FIG. 2 is a block diagram of a host computer 104, in accordance with various representative embodiments. Host computer 104 includes one or more processors 202, memory 204, cache controller 206, cache 208 and link controller 210. Link controller 210 provides a communication port, enabling chip-to-chip communication with the memory device. Cache controller 206 stores copies of data read by the host computer in cache 208 and responds to data invalidation requests from the memory device. When the host computer issues a read request for the event, the cache controller determines a cache "hit" if a valid copy of the data is in the cache and supplies the data from the cache. The cache controller determines a cache "miss" if no valid copy of the data is in the cache and requests the data from the memory device.

Figure 3:
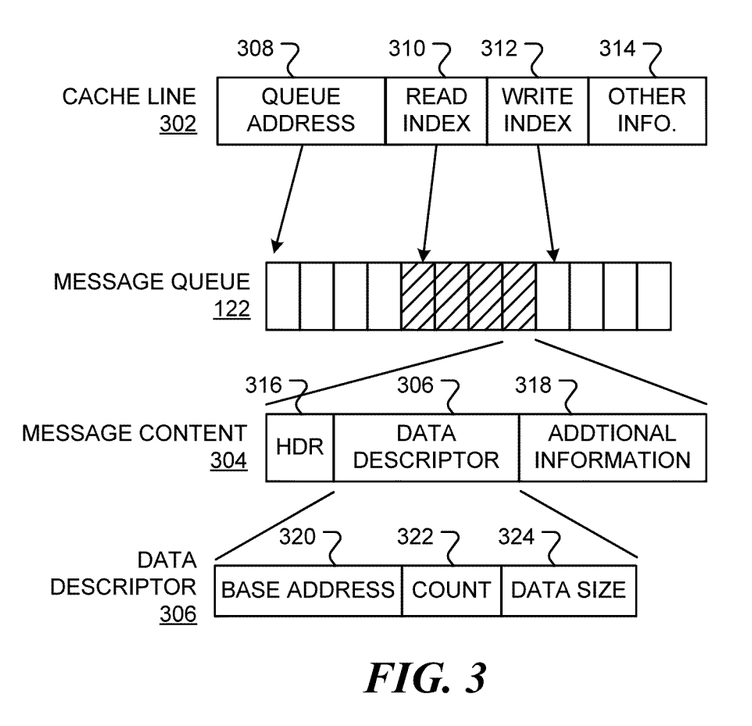
FIG. 3 is a diagrammatic representation of information storage in a memory device, in accordance with various representative embodiments.

FIG. 3 is a diagrammatic representation of information storage in a memory device, in accordance with various representative embodiments. The information includes cache line 302, located in the hardware coherent memory region, message queue 122 and message content 304 stored in the hardware coherent memory region or the software-controlled region. Message content 304 includes data descriptor 306. Cache line 302 stores message metadata. In the example shown, the message metadata includes message queue address 308, indicating the base address of message queue 122, queue read index 310, queue write index 312 and, optionally, other information 314. Queue read index 310 indicates the oldest unread message in the queue, while queue write index 312 indicates the next available slot for a message to be written, A cache line may contain message metadata for one or more messages, the messages directed to one or more host computers. Message queue 122 may be organized as a circular buffer, for example. Message content 304 includes optional header information 316, data descriptor 306 and optional additional information 318. In the example shown, data descriptor 306 includes base address 320 of a data block, count 322 indicating the number of elements in the data block and data size 324 indicating the size of elements in the data block, Data descriptors with other formats may be used without departing from the present disclosure.

Figure 4:
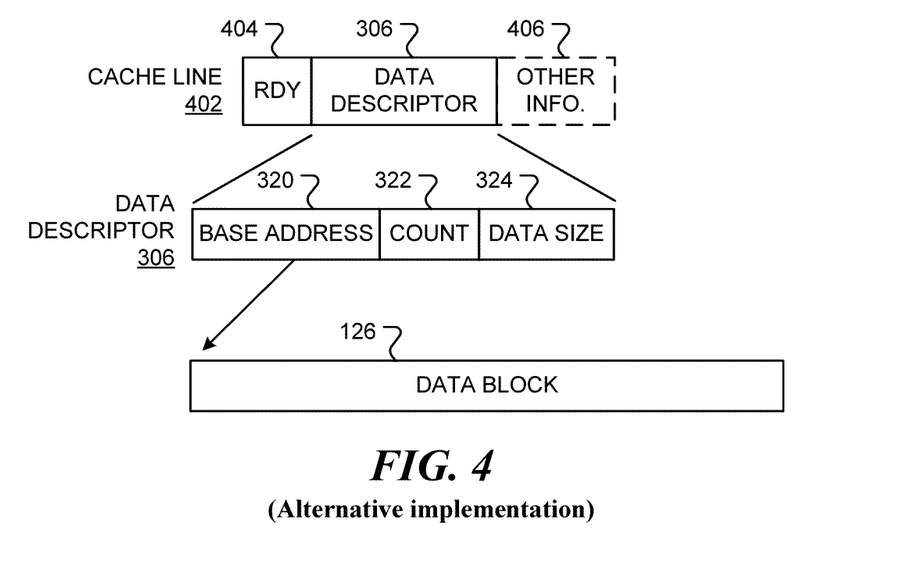
FIG. 4 is a further diagrammatic representation of information storage in a memory device, in accordance with further representative embodiments.

FIG. 4 is a diagrammatic representation of information storage in a memory device, in accordance with further representative embodiments. In FIG. 4, the message metadata stored in cache line 402 includes "message ready" bit 404, data descriptor 306 and optional other information 406. Metadata for multiple messages may be stored in the same cache line. Message ready bit 404 is set by a first host computer when it writes a new data descriptor to the cache line and is cleared by a second host computer when the data descriptor is read. The first host computer may be prevented from updating the data descriptor when the message ready bit is set. Base address 320 in the data descriptor indicates the start of data block 126 in the software-controlled memory region.

Figure 5:
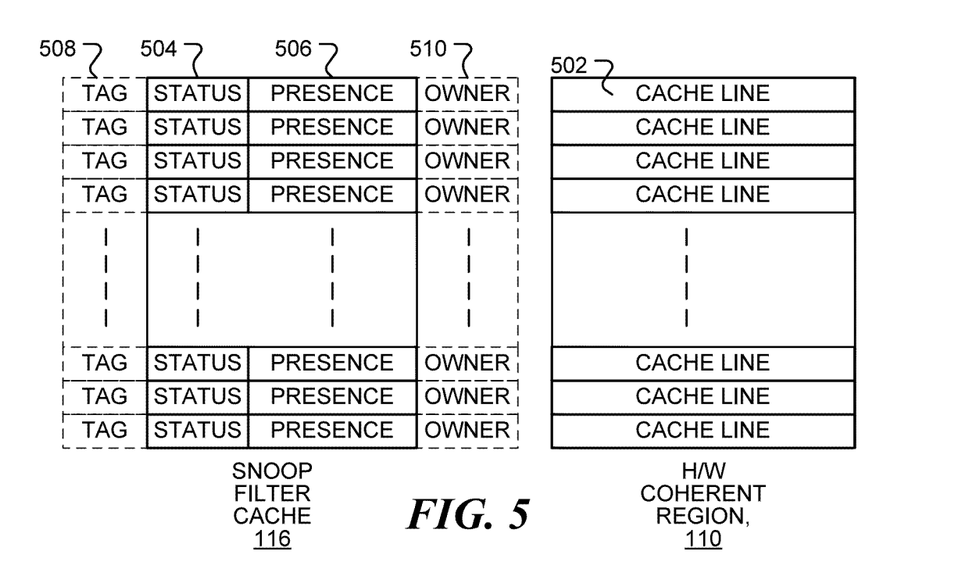
FIG. 5 shows a snoop filter cache and hardware coherent memory region of a memory device, in accordance with various representative embodiments.

FIG. 5 shows snoop filter cache 116 and hardware coherent memory region 110 of a memory device, in accordance with various representative embodiments. Hardware coherent memory region 110 is organized as a number of cache lines 502. A cache line may be a designated number of memory bytes and is used to store message metadata. In one embodiment, snoop filter cache 116 has an entry for each cache lines 502. An entry includes status field 504, which indicates a coherence status of a corresponding cache line, and presence vector 506. Each bit in presence vector 506 is associated with a host computer. The bit is set when the associated host computer has a valid copy of the cache line in its local cache. Optionally, an entry may contain field 510 indicating one of the host computers that has ownership of the cache line, giving the host computer permission to modify the cache line.

In a further embodiment, snoop filter cache 116 has fewer entries that the number of cache lines. In this case, an entry may contain an address tag field 508 that identifies the cache line that it is associated with.

Figure 6:
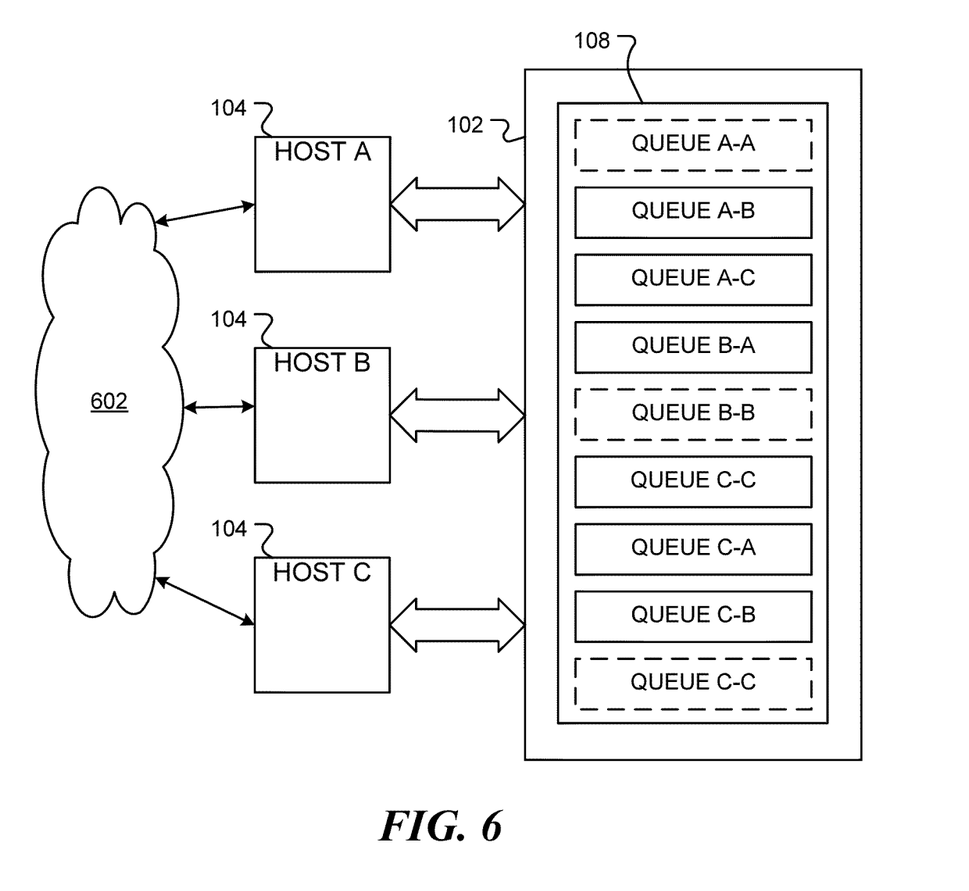
FIG. 6 is a diagrammatic representation of message queue storage, in accordance with various representative embodiments.

FIG. 6 is a diagrammatic representation of message queue storage, in accordance with various representative embodiments. For simplicity, only three host computers 104 are shown, although any number of host computers may share memory device 102. In the embodiment shown, memory array 108 stores a message queue for each pair of host computers. For example, queue A-B is used messages passed from host computer A to host computer B. Optionally, queue A-A, queue B-B and queue C-C are included to enable message passing between processor cores of the same host computer.

In a further embodiment, a single message queue is used to pass messages to a host computer, the queue being shared by the other host computers.

Optionally, host computers 104 are interconnected by interconnect 602, such as a network. This enables, for example, a first host computer to signal a second host computer when an updated message is ready. Additionally, interconnect 602 may be used to enable a first host computer to stash updated message metadata in a local cache of a second host computer.

Figure 7:
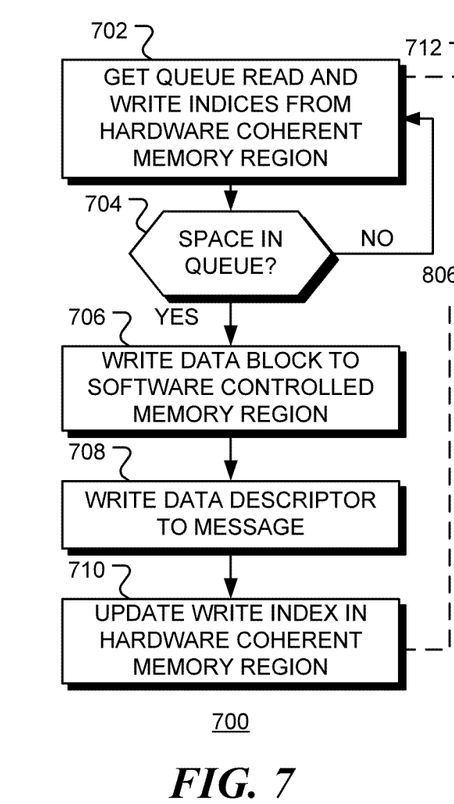
FIG. 7 is a flow chart of a method of operation of a first host computer of a data processing system, in accordance with various representative embodiments.

FIG. 7 is a flow chart of a method 700 of operation of a first host computer of a data processing system, in accordance with various representative embodiments. At block 702, the first host computer reads message metadata from a cache line in the hardware coherent memory region of the memory device. In this example, the metadata includes a read index and a write index for a message queue associated with a second host computer. If the read and write index indicate that there is no space in the message queue, as depicted by the negative branch from decision block 704, flow returns to block 702. Otherwise, as depicted by the positive branch from decision block 704, the first host computer writes a data block to the software-controlled memory at block 706 and writes a corresponding data descriptor to a message at block 708. At block 710 the first host computer updates the write index in the hardware coherent memory region.

Figure 8:
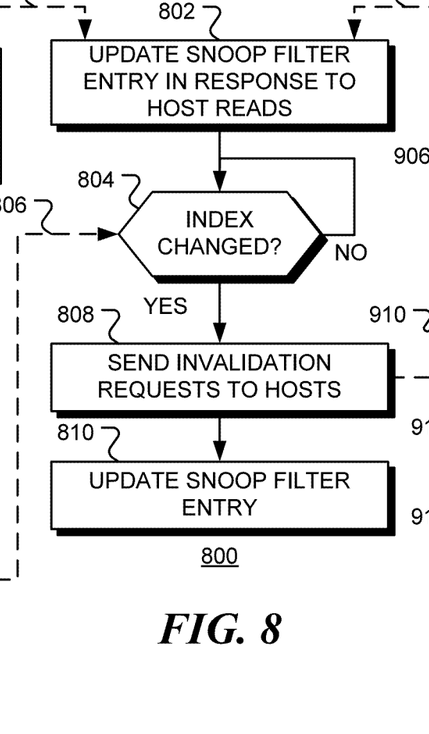
FIG. 8 is a flow chart of a method of operation of coherency control circuitry of a data processing system, in accordance with various representative embodiments.

FIG. 8 is a flow chart of a method 800 of operation of coherency control circuitry of a data processing system, in accordance with various representative embodiments. At block 802, the coherency control circuitry updates a snoop filter in response to a host computer reading a cache line in the hardware coherent memory region (such as when a write index is read, as indicated by broken lines 712 and 904). This may include setting an associated bit in a presence vector, for example. When the index is updated, as depicted by the positive branch from decision block 804, (as a result of the first host computer updating the write index as depicted by broken line 806, for example), the coherency control circuitry determines, from the presence vector, which host computers have a copy of the index and sends invalidation requests to those host computers at block 808. The corresponding entry in the snoop filter cache is updated at block 810.

Figure 9:
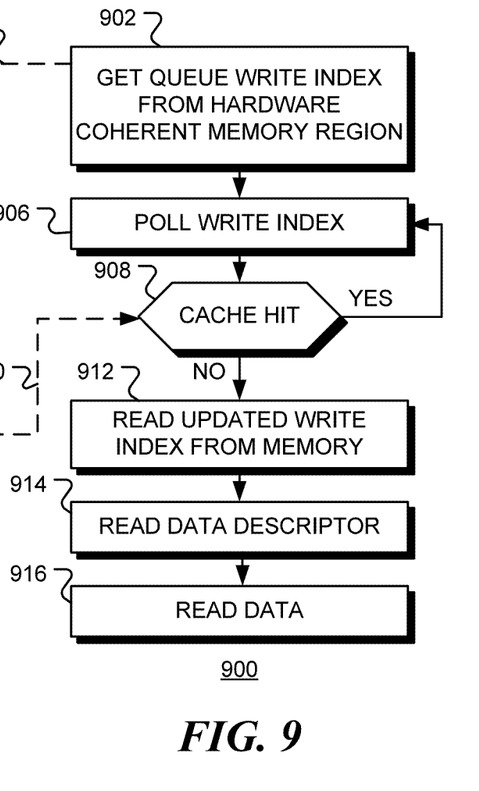
FIG. 9 is a flow chart of a method of operation of a second host computer of a data processing system, in accordance with various representative embodiments.

FIG. 9 is a flow chart of a method 900 of operation of a second host computer of a data processing system, in accordance with various representative embodiments. At block 902, the second host computer reads a queue write index from the hardware coherent memory region. As indicated by broken line 904, this causes the coherency control circuitry to update a corresponding snoop filter entry. The write index is stored in a local cache of the second host computer. At block 906, the second host computer polls the write index. This results in a "hit" in the local cache, as indicated by positive branch from decision block 908. When the cached value is invalidated by the coherency control circuitry, as indicated by broken line 910, a cache "miss" occurs, as depicted by the negative branch from decision block 908. The second host computer reads an updated write index from the hardware coherent memory region at block 912. Based on the write index, the second host computer reads a data descriptor from the memory device at block 914 and reads a corresponding data block at block 916. In this way, the data block is transferred from the first host computer to the second host computer.

Figure 10:
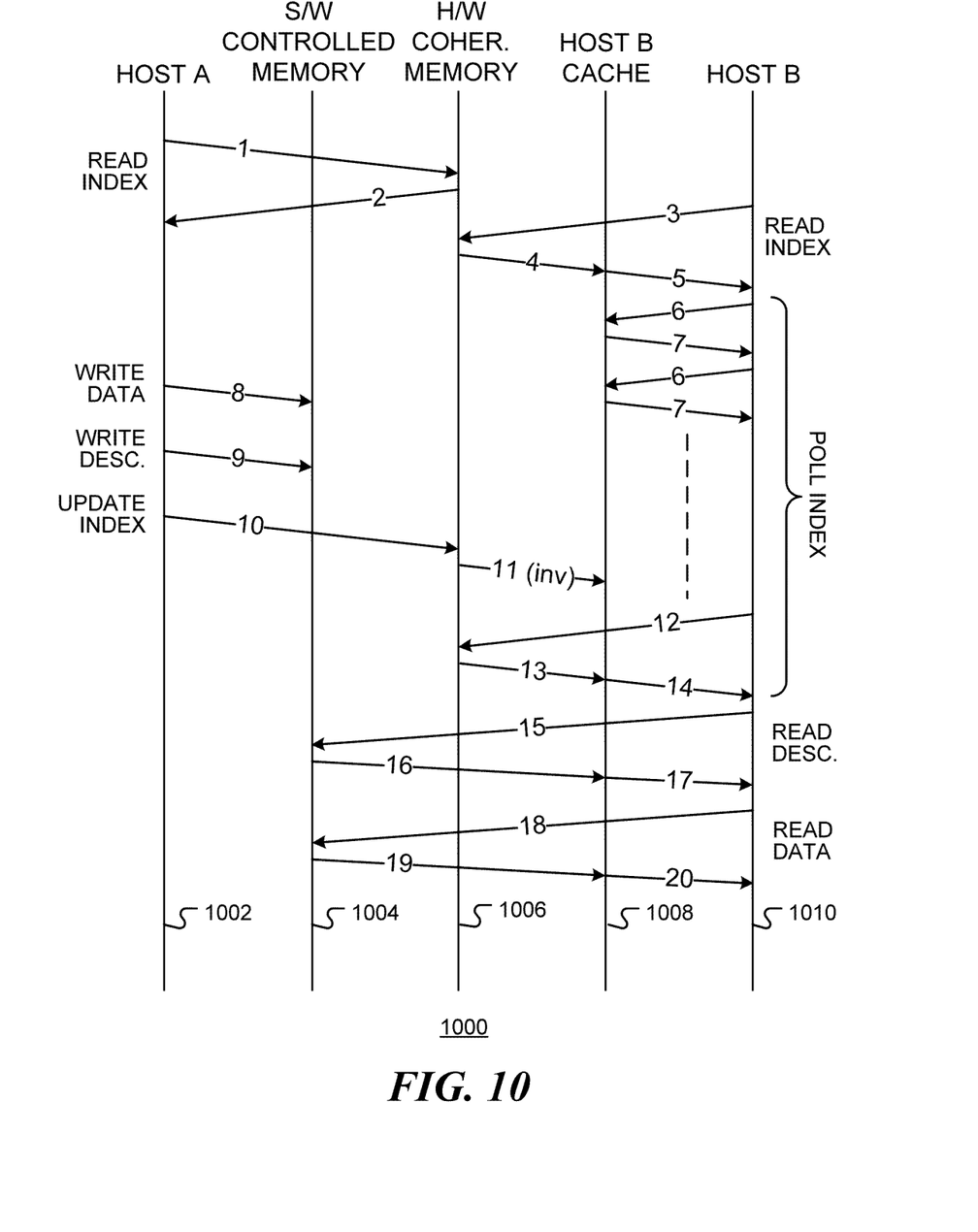
FIG. 10 is a sequence diagram of a method of data transfer in a data processing system, in accordance with various representative embodiments.
Figure 11:
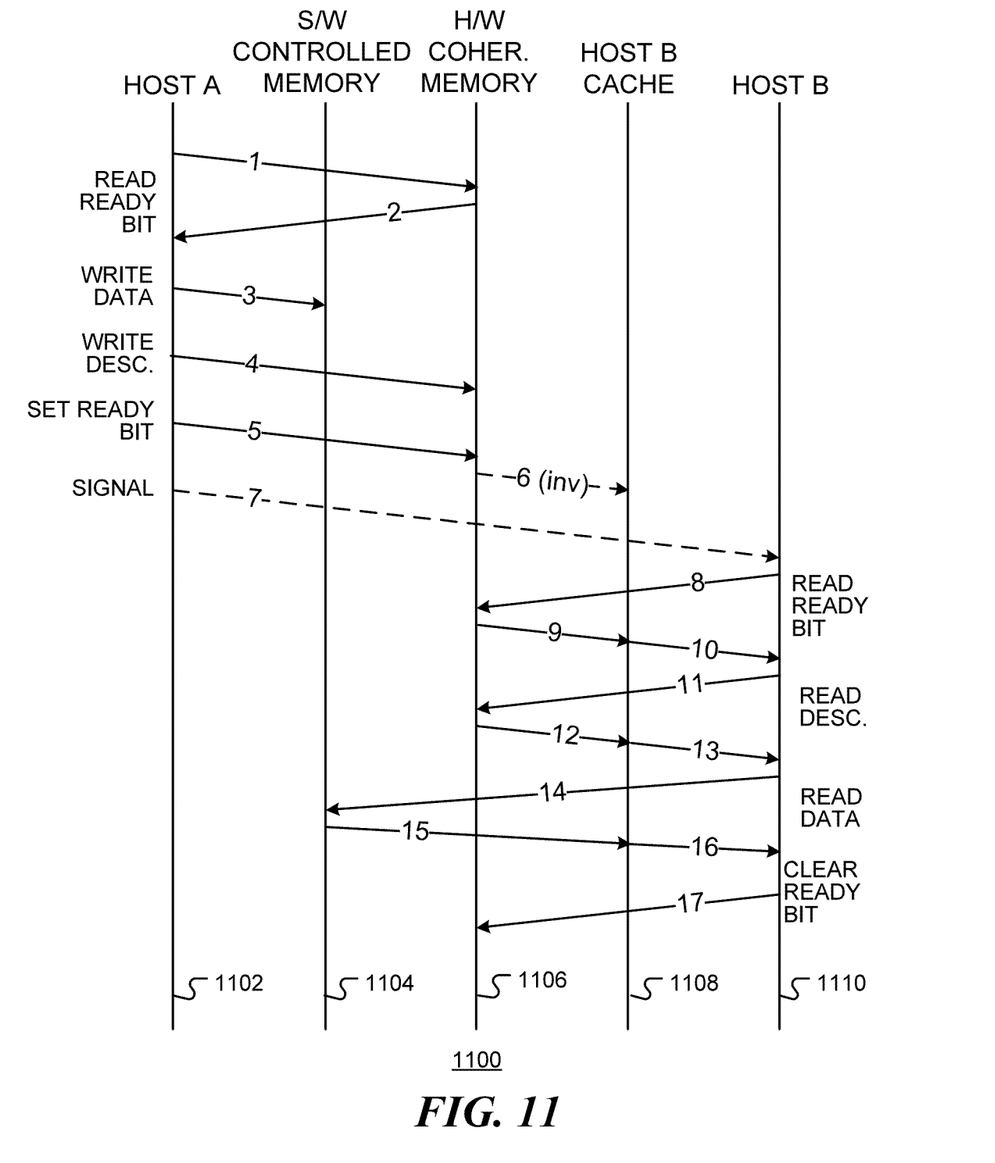
FIG. 11 is a sequence diagram of a further method of data transfer in a data processing system, in accordance with various representative embodiments.

FIG. 10 is a sequence diagram of a method 1000 of data transfer in a data processing system, in accordance with various representative embodiments. The sequence diagram shows timeline 1002 for a first host computer (HOST A), timeline 1004 for a software-controlled memory region, timeline 1006 for a hardware coherent memory region, timeline 1008 for a local cache of a second host computer (HOST B CACHE), and timeline 1010 for the second host computer (HOST B). HOST A requests message metadata in signal 1 from the hardware coherent memory region and receives the metadata in signal 2. In this example, the metadata is a write index of a message queue associated with HOST B. HOST B reads the same write index with request 3. The index, returned signal 4, is stored in the local cache and passed to a processor of HOST 13 in signal 5. HOST B then polls the write index in requests 6, receiving the local copy of the index in signals 7. HOST A writes the data block to be transferred to the software-controlled memory region in signal 8 and writes a corresponding data descriptor in signal 9. The data descriptor may be stored in the hardware coherent region or the software-controlled region. In signal 10, HOST A updates the message metadata (the write index in this example). In response, the coherency control circuitry of the hardware coherent region sends an invalidation request (signal 11) to HOST B. When HOST B next polls the write index, the write index is requested from the memory device in request 12 and returned to the cache in signal 13 and to HOST B processor in signal 14, This indicates to HOST B that a new message is ready. If the metadata in only updated in a local cache of host A, the request by HOST B will cause the updated metadata to be flushed back to the hardware coherent memory region. HOST B then requests the data descriptor in the new message in request 15, receiving the data descriptor in signals 16 and 17. Finally, HOST B requests some or all of the data in the data block in request 18, receiving the data in signals 19 and 20. In this manner, data is transferred from HOST A to HOST B via the shared memory device, FIG. 11 is a sequence diagram of a further method 1100 of data transfer in a data processing system, in accordance with various representative embodiments. The sequence diagram shows timeline 1102 for a first host computer (HOST A), timeline 1104 for a software-controlled memory region, timeline 1106 for a hardware coherent memory region, timeline 1108 for a local cache of a second host computer (HOST B CACHE), and timeline 1110 for the second host computer (HOST B). HOST A requests message metadata in signal 1 from the hardware coherent memory region and receives the metadata in signal 2. In this example, the metadata is a "message ready" bit. If the message ready bit is not set, HOST A writes a data block to the software-controlled data region in signal 3 and writes a message including a corresponding data descriptor in signal 4. HOST A sets the message ready bit in signal 5. Any copies of the metadata at other host computers are invalidated using signal 6. In this example, the data descriptor is written the hardware coherent memory, region. In alternative embodiments, it may be written to the software-controlled memory region. HOST B may poll the message ready bit or, as shown in FIG. 11, HOST A may signal HOST B using signal 7 transmitted through a signaling channel (such as a network interconnect, for example). HOST B requests the message ready bit in request 8 and receives the message ready bit in signals 9 and 10. HOST B then requests the data descriptor in signal 11 and receives it in signals 12 and 13. Finally, HOST B requests some or all of the data in the data block in request 14, receiving the data in signals 15 and 16. In this manner, data is transferred from HOST A to HOST B via the shared memory device, HOST B clears the message ready bit using signal 17.

Data transfer between host computers using a shared memory device may use a combination of the techniques described above.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or," as used herein, is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

As used herein, the term "configured to," when applied to an element, means that the element may be designed or constructed to perform a designated function, or that is has the required structure to enable it to be reconfigured or adapted to perform that function.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Dedicated or reconfigurable hardware components used to implement the disclosed mechanisms may be described, for example, by instructions of a hardware description language (HDL), such as VHDL, Verilog or RTL (Register Transfer Language), or by a netlist of components and connectivity. The instructions may be at a functional level or a logical level or a combination thereof. The instructions or netlist may be input to an automated design or fabrication process (sometimes referred to as high-level synthesis) that interprets the instructions and creates digital hardware that implements the described functionality or logic.

The HDL instructions or the netlist may be stored on non-transitory computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added, or operations can be deleted, without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

What is claimed is:

1. A memory device including:
   a memory array having a first memory region and a second memory region;
   a plurality of communication ports configured to couple the memory device to a plurality of host computers of a data processing system and enabling:
      a first host computer of the plurality of host computers to:
         write a data block to the second memory region;
         write a message, including a data descriptor of the data block, to the first or second memory region; and
         write message metadata, associated with the message, to the first memory region; and
      a second host computer of the plurality of host computers to read the message metadata, the data descriptor and the associated data block; and
   coherency control circuitry configured to control coherency of data in the first memory region, including sending an invalidation request to the second host computer to invalidate a copy of the message metadata stored in a local cache of the second host computer, the invalidation request sent in response to the first host computer writing the message metadata to the first memory region.

2. The memory device of claim 1, where the message metadata includes a write index of a message queue in the first or second memory region, the message queue associated with the second host computer.

3. The memory device of claim 1, where the message metadata includes a "message ready" bit set by the first host computer and cleared by the second host computer.

4. The memory device of claim 1, where the data descriptor of the data block includes a base address, a data element count and a data element size.

5. The memory device of claim 1, where the coherency control circuitry also includes a snoop filter cache and where the coherency control circuitry is further configured to:
   in response to the second host computer reading the message metadata, update a presence vector in the snoop filter cache to indicate a copy of the message metadata in the local cache of the second host computer; and
   in response to the first host computer updating the message metadata, identify, from the presence vector, the second host computer having a copy of the message metadata in a local cache of the second host computer and send the invalidation request to the identified second host computer.

6. A data processing system including the memory device of claim 1 and further including the plurality of host computers, where a host computer of the plurality of host computers includes:
   a communication port configured to operably couple the host computer to a communication port of the memory device;
   one or more processors;
   a local cache, accessible to the one or more processors, configured to store a copy of message metadata read from the memory device via the communication port and to invalidate the copy of the message metadata in response to a request from the memory device via the communication port;

a memory coupled to the one or more processors, the memory configured to store a program of computer executable instructions that, when executed on the one or more processors, cause the host computer to poll the message metadata, including:

in the event of a cache hit:
accessing a copy of the message metadata in the local cache; and in the event of a cache miss:
reading an updated copy of the message metadata from the memory device;
reading a data descriptor from a message in accordance with the updated copy of the message metadata; and
reading a data block from the second memory region in accordance with the data descriptor.

7. A data processing system including the memory device of claim 1 and further including the plurality of host computers, where the first host computer is configured to signal the second host computer when the message metadata has been updated.

8. The memory device of claim 1, where a host computer of the plurality of host computers is coupled to the memory device via a communication port of the plurality of communication ports and a chip-to-chip communication link.

9. The memory device of claim 1, where the memory array is configured to store a message queue for each host computer.

10. The memory device of claim 1, where the memory array is configured to store a message queue for each pair of host computers.

11. A method of data transfer in a data processing system, comprising:

a first host computer of data processing system:
writing a data block to a software-controlled memory region of a memory device via a chip-to-chip communication link;
writing a message to the software-controlled memory region of the memory device or a hardware coherent memory region of the memory device, the message including a data descriptor of the data block; and
updating message metadata in a cache line of the hardware coherent memory region of the memory device, the cache line associated with a second host computer of the data processing system;

coherency control circuitry for the hardware coherent memory region:
sending an invalidation request to the second host computer in response to updating the message metadata; and the second host computer:
reading the updated message metadata from the hardware coherent memory region;
reading the data descriptor from the message; and
accessing the data block in accordance with the data descriptor.

12. The method of claim 11, where the message is stored in a message queue and the message metadata includes a write index of the message queue.

13. The method of claim 11, where the message metadata includes a "message ready" bit, the method further comprising:
the first host computer setting the message ready bit after updating the message metadata; and
the second host computer clearing the message ready bit after reading the message metadata.

14. The method of claim 11, further comprising the second host computer:
reading the message metadata prior to the first host computer updating the message metadata and storing a copy of the message metadata in a local cache of the second host computer;
polling the message metadata;
invalidating the copy of the message metadata in the local cache of the second computer in response to receiving the invalidation request from the hardware coherency controller; and
accessing the data block after detecting a change in the message metadata,
where said polling by the second host computer includes reading the copy of the message metadata in the local cache when the copy is valid and reading the message metadata in the hardware coherent memory region when the copy is invalid.

15. The method of claim 11, where the message metadata includes a read index and a write index of an associated message queue, the method further comprising the first host computer:
reading the read index and the write index from the hardware coherent memory region;
determining, from the read index and the write index if there is space in the associated message queue; and
updating the write index of the message queue only when there is space in the associated message queue.

16. The method of claim 11, further comprising the coherency control circuitry updating a presence vector stored in a snoop filter cache in response to a host computer reading the message metadata.

17. The method of claim 11, further comprising the first host computer stashing updated message metadata in a local cache of the second computer.

18. A non-transitory computer-readable medium to store computer-readable code for fabrication of a memory device comprising:
a memory array having a first memory region and a second memory region;
a plurality of communication ports configured to couple the memory device to a plurality of host computers of a data processing system and enabling:
a first host computer of the plurality of host computers to:
write a data block to the second memory region;
write a message, including a data descriptor of the data block, to the first or second memory region; and
write message metadata, associated with the message, to the first memory region; and
a second host computer of the plurality of host computers to read the message metadata, the data descriptor and the associated data block; and
coherency control circuitry configured to control coherency of data in the first memory region, including sending an invalidation request to the second host computer to invalidate a copy of the message metadata stored in a local cache of the second host computer, the invalidation request sent in response to the first host computer writing the message metadata to the first memory region.

19. The non-transitory computer-readable medium of claim 18, where the memory device includes a snoop filter cache and where the coherency control circuitry is further configured to:

in response to the second host computer reading the message metadata, update a presence vector in the snoop filter cache to indicate a copy of the message metadata in the local cache of the second host computer; and in response to the first host computer updating the message metadata, identify, from the presence vector, the second host computer having a copy of the message metadata in a local cache of the second host computer and send the invalidation request to the identified second host computer.

20. The non-transitory computer-readable medium of claim 18, where the plurality of communication ports are configured to couple the memory device to the plurality of host computers via a chip-to-chip communication link.

\* \* \* \* \*